J. H. FRANKLIN.
VEHICLE-SEAT.
No. 170,543. Patented Nov. 30, 1875.
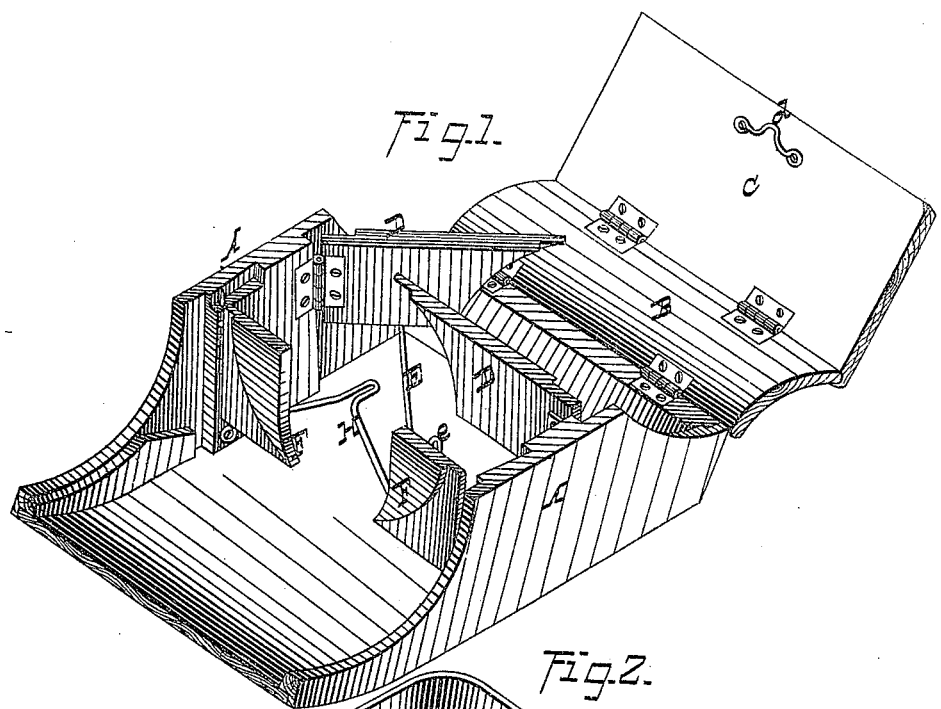
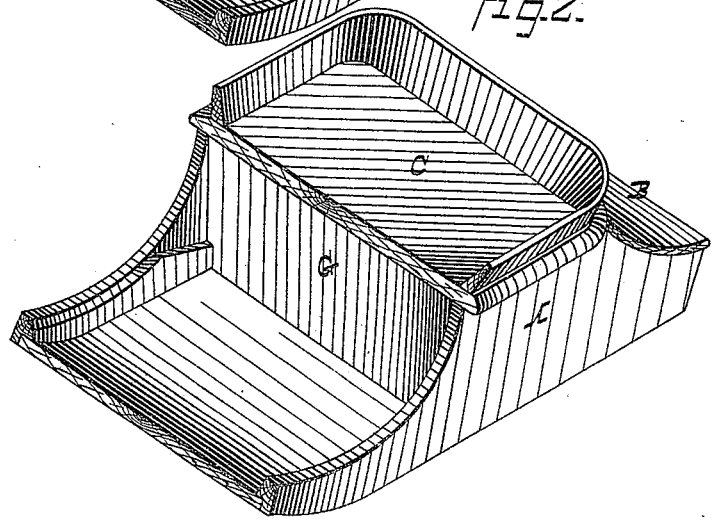
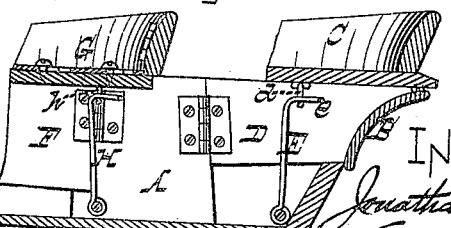

UNITED STATES PATENT OFFICE.

JONATHAN H. FRANKLIN, OF AVOCA, WISCONSIN.

IMPROVEMENT IN VEHICLE-SEATS.

Specification forming part of Letters Patent No. 170,543, dated November 30, 1875; application filed October 28, 1875.

*To all whom it may concern:*

Be it known that I, JONATHAN H. FRANKLIN, of Avoca, in the county of Iowa and State of Wisconsin, have invented certain new and useful Improvements in Buggy or Vehicle Bodies; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1 is a perspective view of my improved buggy or vehicle body, in an extended position. Fig. 2 is a similar view thereof, exhibiting it with but one seat; and Fig. 3 is a vertical longitudinal section of the same.

Corresponding parts in the several figures are denoted by like letters.

This invention relates to a certain improvement in buggy or vehicle bodies, by which a single or two-seated vehicle may be formed; and it consists of a seat hinged to a hinged section of the buggy-body, and supported upon hinged folding sections, and of hinged folding sections forming extensions of the front part of the vehicle, and the two jointly supporting the forward seat, substantially as hereinafter more fully set forth.

In the annexed drawing, A refers to the buggy-body, to the hinged section B of which is hinged the seat C, as clearly shown in Fig. 1. From the point of the conjunction of the section B and buggy-body A, the latter is curved or concaved upwardly to its upper edge to receive the said section, when the seat C is slid forward to constitute the buggy a single-seated one. To the inner sides of the rear end of the buggy-body are hinged pieces or sections D D, which, when extended, as shown, support the seat C, when slid back in the position shown in Fig. 1, or when it is desired to convert the buggy into a two-seated one. To firmly retain the parts thus adjusted in position, a brace, E, pivoted or hinged to the inner side of the buggy-body, and, having a hook, e, hooks into an eye, d, in the lower side of the seat C. F F are also pieces or sections hinged to the inner sides of the forward end of the buggy-body, which, with the latter, jointly support the forward seat G, their addition being necessary to provide the requisite amount of space between the seats, when the vehicle or buggy is formed into a two-seated one. A similar brace with hook, as E, and lettered H, secures the seat G in place, it having an eye, h, to receive the hook of the brace H.

For the sake of convenience in storing the seat G away in the buggy or vehicle, it—the seat—may have its back detachable from its bottom, in the manner shown, or otherwise, and formed in three parts, hinged together, to permit of its being folded together.

Having thus described my invention, what I claim, and desire to secure by Letters Patent, is—

1. The buggy or vehicle body, having the hinged section B, to which is hinged the seat C, by which a single or two-seated vehicle may be formed, substantially as and for the purpose set forth.

2. In combination, with the buggy or vehicle body A, having the hinged section B, provided with the hinged seat C, the hinged folding sections D D, and fastenings E e d, substantially as and for the purpose set forth.

3. The convertible single and double seated vehicle or buggy body, consisting of the body A, hinged folding sections F F, seat G, hinged folding sections D D B, seat C, and fastenings E d and H h, substantially as shown and described.

In testimony that I claim the foregoing as my own I affix my signature in presence of two witnesses.

JONATHAN H. FRANKLIN.

Witnesses:
AUG. GROTE,
GEORGE WILLIAMS.